United States Patent
Hensberry

(10) Patent No.: US 12,173,748 B2
(45) Date of Patent: Dec. 24, 2024

(54) STRUCTURAL JOINT ISOLATOR WITH INTERNAL CAVITIES

(71) Applicant: Raytheon Company, Waltham, MA (US)

(72) Inventor: Kevin M. Hensberry, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 17/832,178

(22) Filed: Jun. 3, 2022

(65) Prior Publication Data

US 2023/0392631 A1 Dec. 7, 2023

(51) Int. Cl.
*F16B 9/00* (2006.01)
*F16F 15/02* (2006.01)

(52) U.S. Cl.
CPC ............... *F16B 9/05* (2018.08); *F16F 15/02* (2013.01)

(58) Field of Classification Search
CPC ...... F16B 5/0241; F16B 5/025; F16B 5/0258; F16B 19/02; F16B 43/001; F16F 1/3732; F16F 1/3735; F16F 1/377; F16F 1/3835; F16F 1/3873; F16F 7/01; F16F 7/015; F16F 15/02; Y10T 403/45; Y10T 403/454; Y10T 403/75
USPC ...................................... 403/220, 224, 408.1
See application file for complete search history.

(56) References Cited

U.S. PATENT DOCUMENTS

| | | | |
|---|---|---|---|
| 4,925,163 A * | 5/1990 | Wolf | F16F 1/377 267/153 |
| 5,878,980 A | 3/1999 | Cooley, Jr. | |
| 6,095,481 A * | 8/2000 | Norkus | F16F 1/3814 248/560 |
| 8,727,654 B2 | 5/2014 | Graham | |
| 9,964,175 B2 * | 5/2018 | Herald | F16F 15/06 |
| 9,964,385 B1 | 5/2018 | Genson | |
| 11,131,533 B1 | 9/2021 | Albrecht | |
| 11,466,714 B2 * | 10/2022 | Arndt | F16B 5/0258 |
| 11,692,603 B2 * | 7/2023 | Jomaa | F16F 1/3732 267/292 |
| 2007/0158888 A1 | 7/2007 | Domen | |
| 2010/0327142 A1 | 12/2010 | Vo | |

(Continued)

FOREIGN PATENT DOCUMENTS

EP 1293701 B1 12/2004
FR 2924480 A1 * 6/2009 .............. F16F 1/377

(Continued)

OTHER PUBLICATIONS

Design of Particle Dampers for Laser Powder Bed Fusion, T. Ehlers, Applied Sciences, Feb. 21, 2022.

(Continued)

*Primary Examiner* — Josh Skroupa
(74) *Attorney, Agent, or Firm* — Getz Balich LLC

(57) ABSTRACT

A structural joint is provided that includes a first component, a second component, an isolator and a fastener. The isolator is engaged with and between the first component and the second component. The isolator includes a plurality of internal cavities between the first component and the second component. The fastener projects out of the first component, through the isolator and into the second component.

17 Claims, 8 Drawing Sheets

(56) References Cited

U.S. PATENT DOCUMENTS

| | | | | |
|---|---|---|---|---|
| 2015/0082936 A1* | 3/2015 | Hebenstreit | ........... | F16F 1/3732 |
| | | | | 74/492 |
| 2017/0152908 A1* | 6/2017 | Yahata | ................ | F16F 1/3835 |
| 2022/0275830 A1* | 9/2022 | Schuh | ..................... | F16F 7/01 |

FOREIGN PATENT DOCUMENTS

| | | |
|---|---|---|
| JP | S52122776 A | 10/1977 |
| JP | H0783261 A | 3/1995 |
| JP | 6911592 B2 | 7/2021 |
| WO | 2020221537 A1 | 11/2020 |

OTHER PUBLICATIONS

Increased Damping Through Captured Powder in Additive Manufacturing, T. Schmitz et al., Manufacturing Letters, May 20, 2020.
Structural Dynamic and Inherent Damping Characterization of Additively Manufactured Airfoil Components, A.W. Goldin, AFIT-ENY-MS-20-M-263, Mar. 2020.
Aerospace Systems Pyrotechnic Shock Data vol. VI Pyrotechnic Shock Design Guidelines Manual, Martin Marietta Corporation, Mar. 7, 1970.
P. Veeramuthuvel et al., "Application of Particle Damper on Electronic Packages for Spacecraft", Acta Astronautica, 2016.
EP Search Report for EP Patent Application No. 23174372.5 dated Dec. 1, 2023.

* cited by examiner

STRUCTURAL JOINT ISOLATOR WITH INTERNAL CAVITIES

BACKGROUND OF THE DISCLOSURE

1. Technical Field

This disclosure relates generally to a structural joint and, more particularly, to an isolator for the structural joint.

2. Background Information

A vibration and/or thermal isolator may be arranged between components of an apparatus at a structural joint. Various types and configurations of structural joints with isolators are known in the art. While these known structural joints have various benefits, there is still room in the art for improvement. There is a need in the art, for example, for a vibration and/or thermal isolator with a relatively small form.

SUMMARY OF THE DISCLOSURE

According to an aspect of the present disclosure, a structural joint is provided that includes a first component, a second component, an isolator and a fastener. The isolator is engaged with and between the first component and the second component. The isolator includes a plurality of internal cavities between the first component and the second component. The fastener projects out of the first component, through the isolator and into the second component.

According to another aspect of the present disclosure, an assembly is provided for a structural joint. This assembly includes an annular spacer and a fastener. The annular spacer is configured as an isolator for the structural joint. The annular spacer extends circumferentially around an axis. The annular spacer includes a plurality of internal cavities extending within the annular spacer. The fastener includes a head and a shank connected to the head. The shank projects axially out from the head and through an inner bore of the annular spacer.

According to still another aspect of the present disclosure, an isolator is provided for a structural joint. This isolator includes an isolator body and powder. The annular body extends circumferentially around an axis. The annular body includes a first cavity and a second cavity. The first cavity extends circumferentially about the axis within the annular body. The second cavity extends circumferentially about the axis within the annular body. The second cavity is axially offset from the first cavity along the axis and radially offset from the first cavity relative to the axis. The powder is within the first cavity and the second cavity. The annular body is configured from or otherwise includes metal.

The powder may be configured from or otherwise include metal and/or ceramic.

The annular spacer may also include a body and powder. The body may form the internal cavities. The powder may be within one or more of the internal cavities.

The isolator may be configured to attenuate shock wave transmission between the first component and the second component. The isolator may also or alternatively be configured to attenuate heat transfer between the first component and the second component.

The isolator may be configured from or otherwise include metal.

The internal cavities may include a first cavity. The isolator may also include powder within the first cavity.

The isolator may also include an isolator body forming the internal cavities. The isolator body and the powder may be configured from or otherwise (or only) include a common material.

The isolator may also include an isolator body forming the internal cavities. The isolator body may be configured from or otherwise include body material. The powder may be configured from or otherwise include powder material that is different than the body material.

The internal cavities may include an empty first cavity.

The internal cavities may include a first cavity extending circumferentially about the fastener.

The internal cavities may include a first cavity with a longitudinal centerline. The first cavity may extend longitudinally along the longitudinal centerline within the isolator. At least a portion (or an entirety) of the longitudinal centerline may be curved. In addition or alternatively, at least a portion (or the entirety) of the longitudinal centerline may be straight.

The isolator may include a base, an inner wall and an outer wall. The base may extend circumferentially about the fastener and radially between an inner side and an outer side. The internal cavities may extend through the base. The inner wall may be attached to the base at the inner side and may cover an inner side opening to at least one of the internal cavities. The outer wall may be attached to the base at the outer side and may cover an outer side opening to at least one of the internal cavities.

The isolator may extend circumferentially about an axis. The internal cavities may include a first cavity and a second cavity. The first cavity may be axially aligned with the second cavity along the axis.

The isolator may extend circumferentially about an axis. The internal cavities may include a first cavity and a second cavity. The first cavity may be axially offset from the second cavity along the axis.

The isolator may extend circumferentially about an axis. The internal cavities may include a first cavity and a second cavity. The first cavity may be radially aligned with the second cavity relative to the axis.

The isolator may extend circumferentially about an axis. The internal cavities may include a first cavity and a second cavity. The first cavity may be radially offset from the second cavity relative to the axis.

The isolator may be disposed in a pocket formed by and between the first component and the second component.

The first component may not be in contact with the second component.

The fastener may include a head and a shank attached to the head. The head may be engaged with the first component. The shank may project out from the head, through the first component and the isolator, into the second component.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
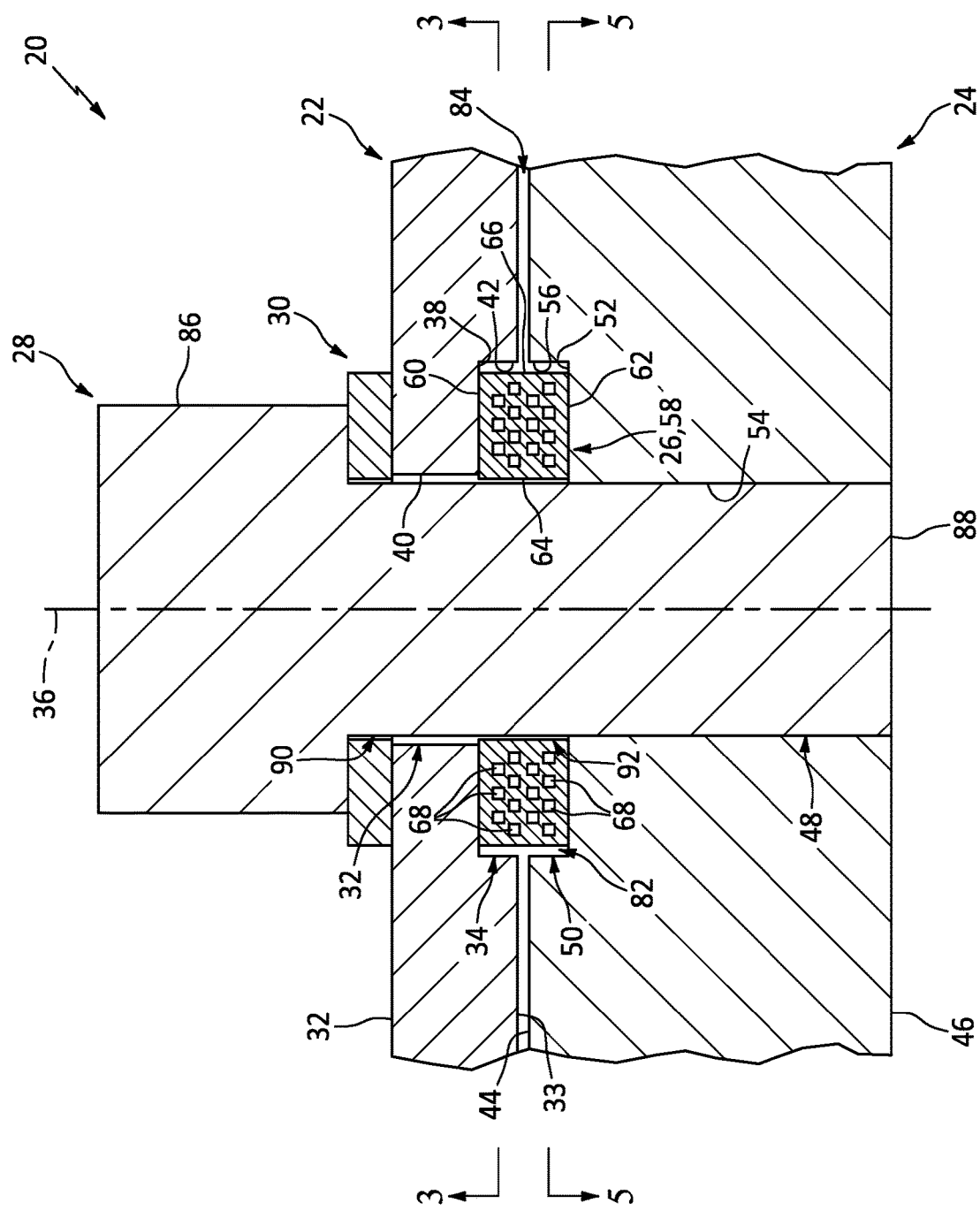
FIG. 1 is a partial sectional illustration of a structural joint for an apparatus.

FIG. 1 illustrates a structural joint 20 for an apparatus such as, but not limited to, a vehicle, an engine, a housing or a support structure. The structural joint 20 includes a first component 22, a second component 24, a (e.g., high frequency) shock, vibration and/or thermal isolator 26 and a fastener 28. The structural joint 20 may also include a fastener washer 30.

The first component 22 extends vertically between and to a first side 32 of the first component 22 and a second side 33 of the first component 22. The first component 22 includes a first fastener aperture 32 and a first recess 34, where the first fastener aperture 32 may be an unthreaded bore and the first recess 34 may be a counterbore for the first fastener aperture 32.

Figure 2:
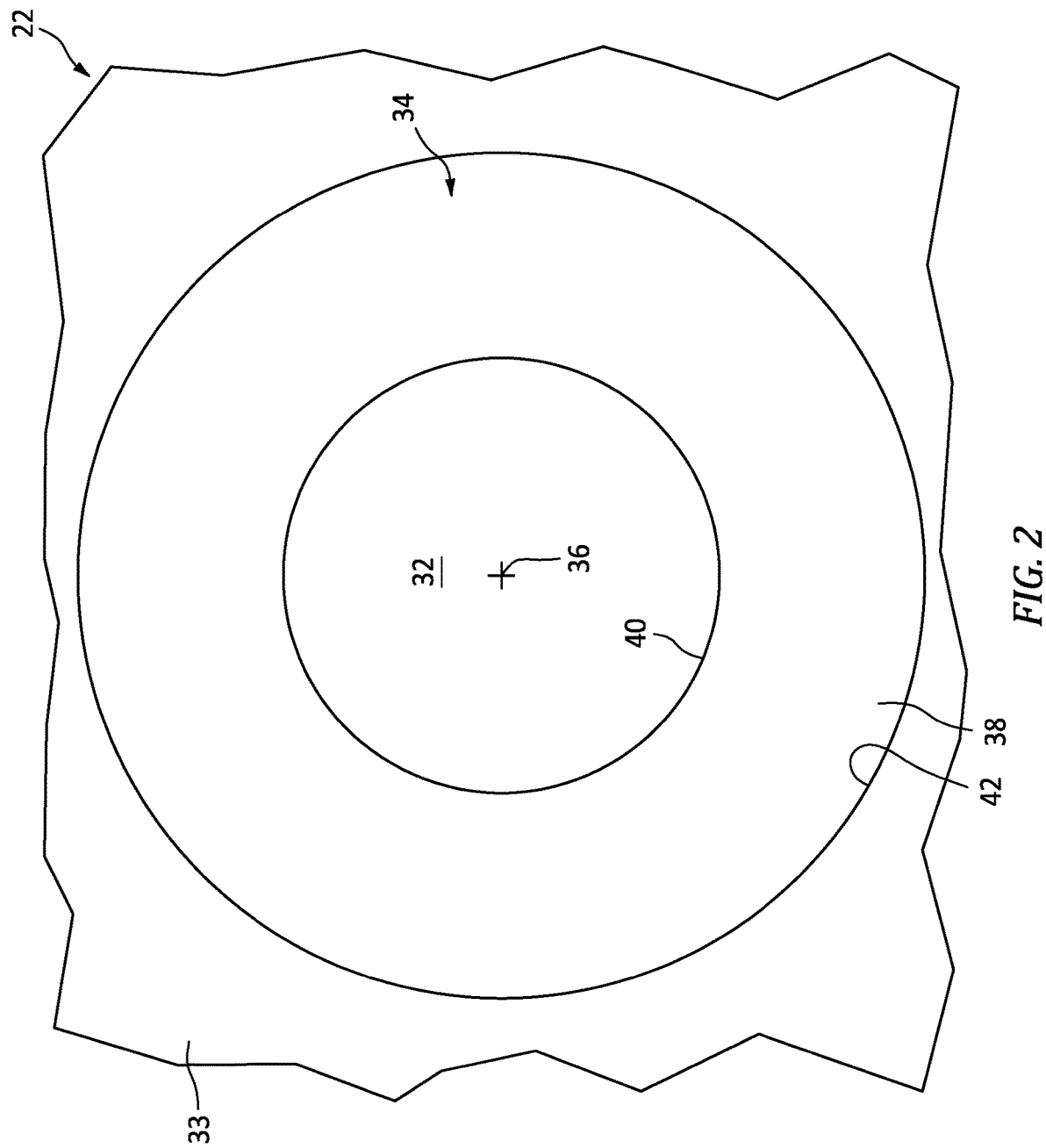
FIG. 2 is a side illustration of a portion of a first component in the structural joint.

The first fastener aperture 32 extends axially along an axis 36 (e.g., in the vertical direction) within the first component 22, which axis 36 may be an axial centerline of the isolator 26 and/or the fastener 28. The first fastener aperture 32 of FIG. 1, for example, extends axially into the first component 22 from the first component first side 32 to the first recess 34 at an axial end 38 of the first recess 34. The first fastener aperture 32 extends radially within the first component 22 out from the axis 36 to a radial outer side 40 of the first fastener aperture 32. This first fastener aperture outer side 40 of FIG. 1 extends axially between and to the first component first side 32 and the first recess axial end 38. Referring to FIG. 2, the first fastener aperture 32 and its outer side 40 have a cross-sectional geometry when viewed in a reference plane, for example, perpendicular to the axis 36. This cross-sectional geometry FIG. 2 has a circular shape.

Referring to FIG. 1, the first recess 34 is disposed at the first component second side 33. The first recess 34 extends axially along the axis 36 within the first component 22. The first recess 34 of FIG. 1, for example, extends axially into the first component 22 from the first component second side 33 to the first recess axial end 38 and the first fastener aperture 32. The first recess 34 extends radially within the first component 22 out from the first fastener aperture outer side 40 to a radial outer side 42 of the first recess 34. This first recess outer side 42 of FIG. 1 extends axially between and to the first recess axial end 38 and the first component second side 33. Referring to FIG. 2, the first recess 34 and its outer side 42 have a cross-sectional geometry when viewed in the reference plane. This cross-sectional geometry may have a circular shape. This cross-sectional geometry, however, may alternatively be any other shape which, for example, matches (e.g., contours to and/or is sized to accommodate) a shape of a cross-sectional geometry of the isolator 26; e.g., see FIG. 3.

Referring to FIG. 1, the second component 24 extends vertically between and to a first side 44 of the second component 24 and a second side 46 of the second component 24. The second component 24 includes a second fastener aperture 48 and a second recess 50, where the second fastener aperture 48 may be a threaded bore and the second recess 50 may be a counterbore for the second fastener aperture 48.

Figure 4:
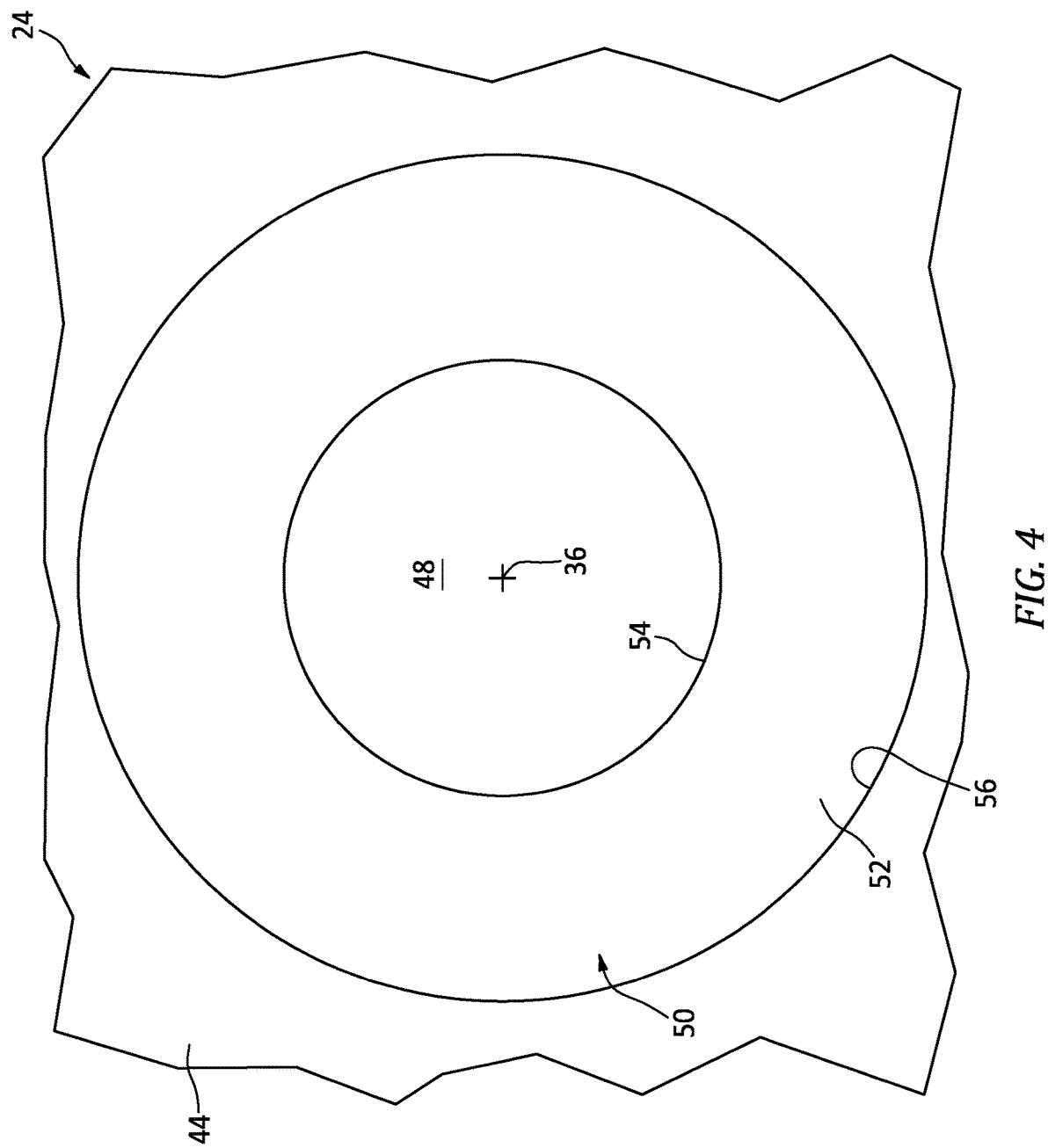
FIG. 4 is a side illustration of a portion of a second component in the structural joint.

The second fastener aperture 48 extends axially along the axis 36 within the second component 24. The second fastener aperture 48 of FIG. 1, for example, extends axially into the second component 24 from the second component second side 46 to the second recess 50 at an axial end 52 of the second recess 50. The second fastener aperture 48 extends radially within the second component 24 out from the axis 36 to a radial outer side 54 of the second fastener aperture 48. This second fastener aperture outer side 54 of FIG. 1 extends axially between and to the second component second side 46 and the second recess axial end 52. Referring to FIG. 4, the second fastener aperture 48 and its outer side 54 have a cross-sectional geometry when viewed in the reference plane. This cross-sectional geometry of FIG. 4 has a circular shape.

Referring to FIG. 1, the second recess 50 is disposed at the second component first side 44. The second recess 50 extends axially along the axis 36 within the second component 24. The second recess 50 of FIG. 1, for example, extends axially into the second component 24 from the second component first side 44 to the second recess axial end 52 and the second fastener aperture 48. The second recess 50 extends radially within the second component 24 out from the second fastener aperture outer side 54 to a radial outer side 56 of the second recess 50. This second recess outer side 56 of FIG. 1 extends axially between and to the second recess axial end 52 and the second component first side 44. Referring to FIG. 4, the second recess 50 and its outer side 56 have a cross-sectional geometry when viewed in the reference plane. This cross-sectional geometry may have a circular shape. This cross-sectional geometry, however, may alternatively be any other shape which, for example, matches the shape of the cross-sectional geometry of the isolator 26; e.g., see FIG. 5. The cross-sectional geometry of the second recess 50 and its outer side 56 of FIG. 4 and the cross-sectional geometry of the first recess 34 and its outer side 42 of FIG. 2 may have a common (e.g., the same) shape and/or size; however, the present disclosure is not limited to such an arrangement.

Figure 3:
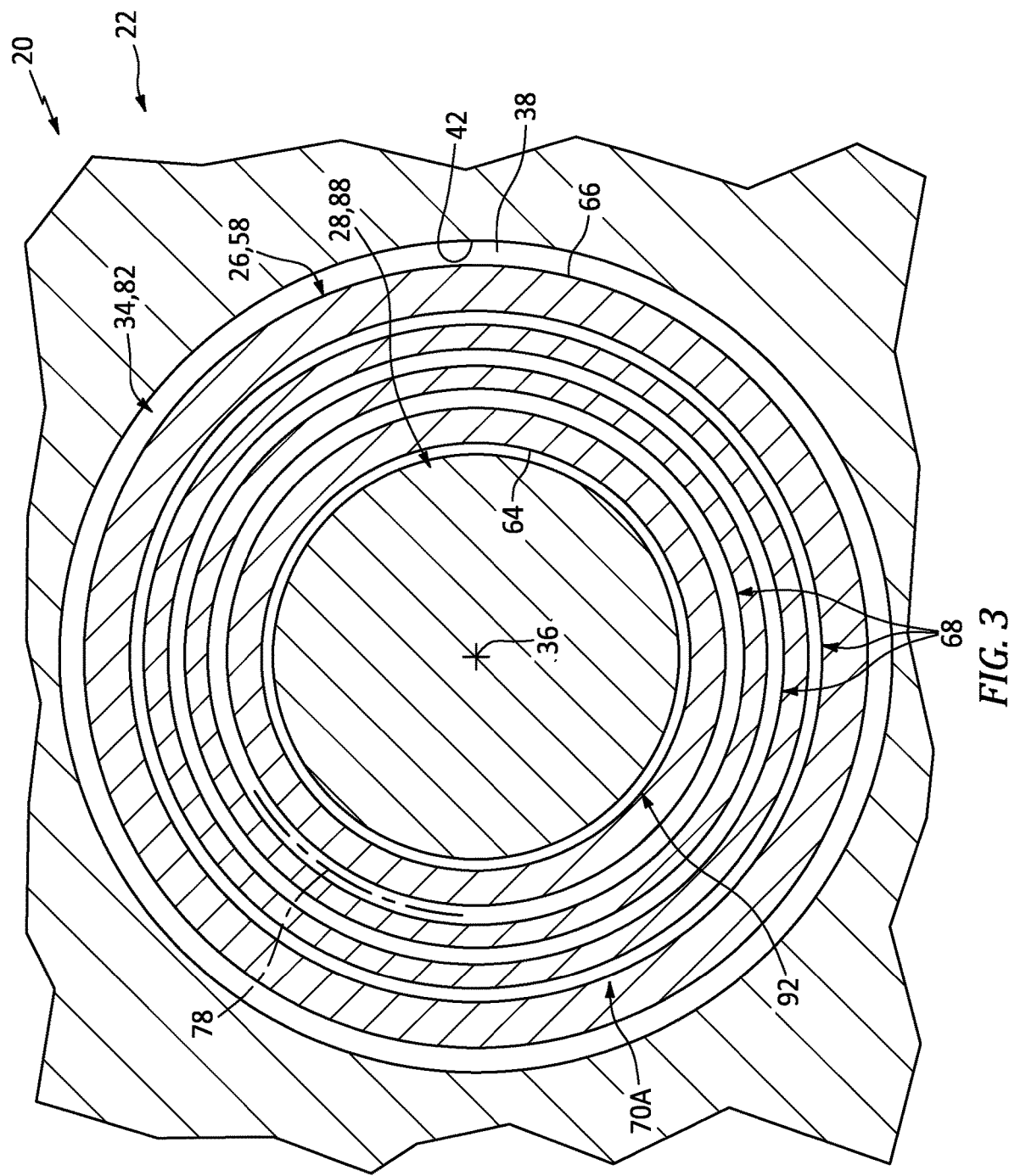
FIG. 3 is a cross-sectional illustration of the structural joint taken along line 3-3 in FIG. 1.
Figure 5:
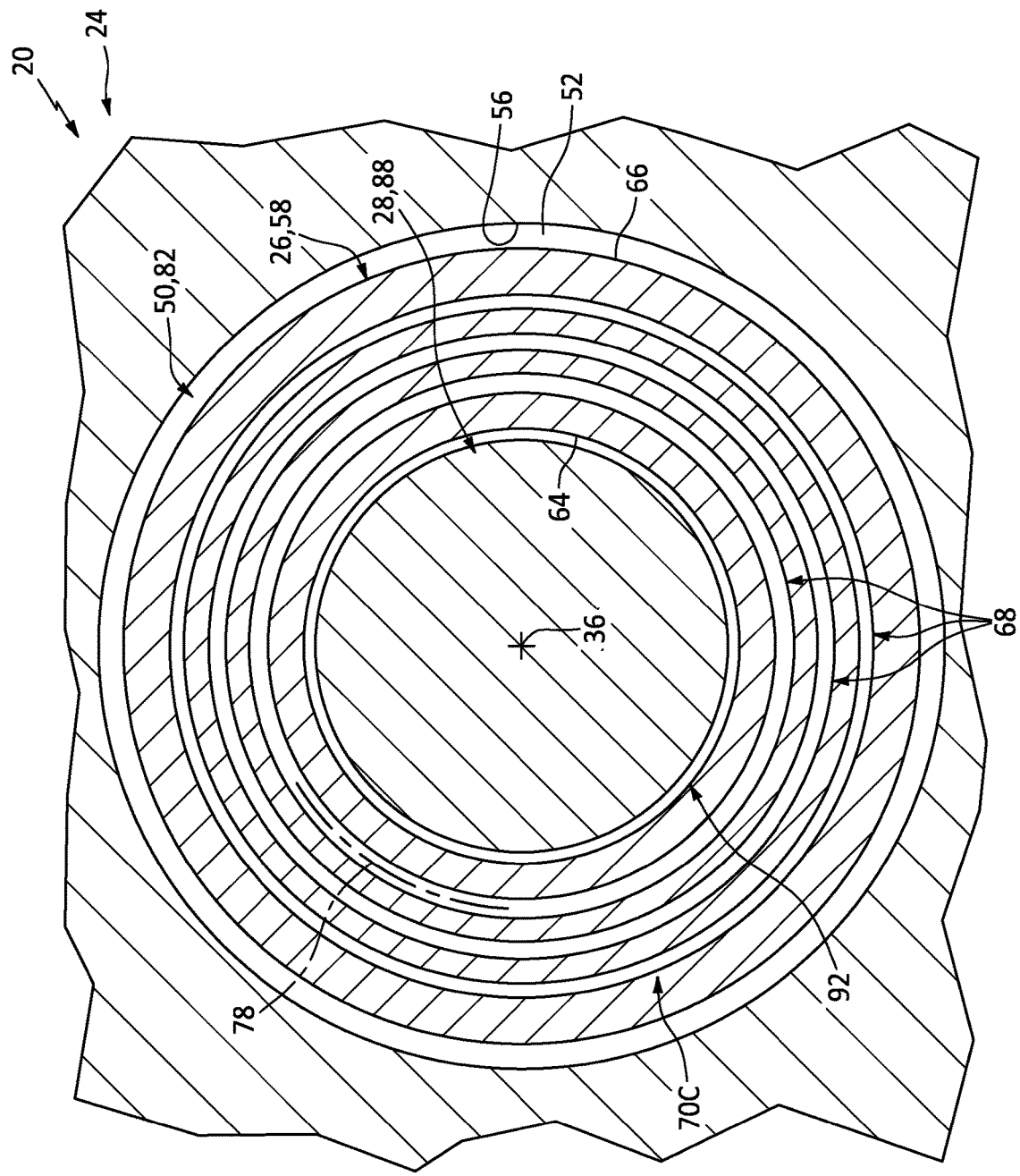
FIG. 5 is a cross-sectional illustration of the structural joint taken along line 5-5 in FIG. 1.
Figure 6:
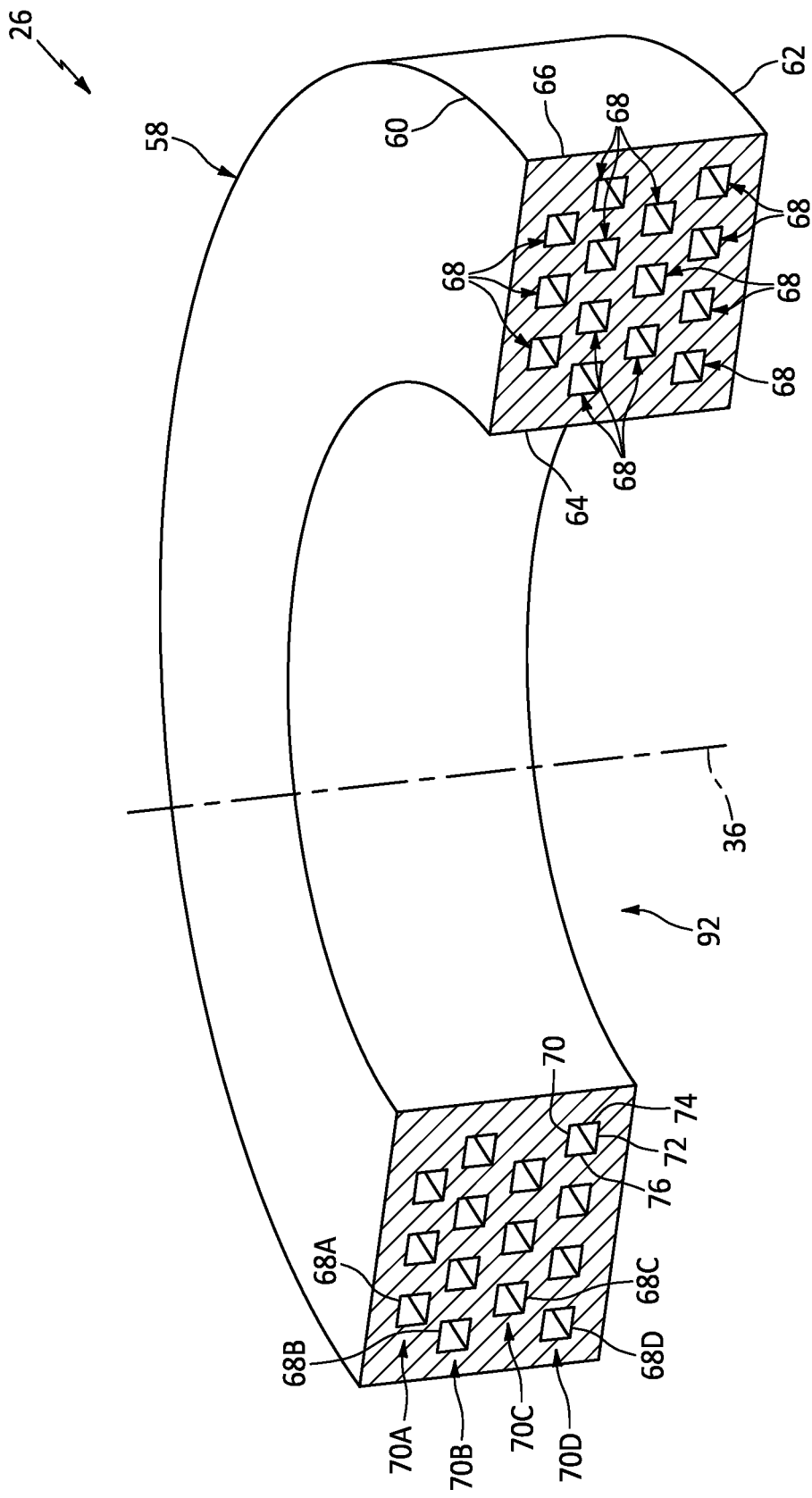
FIG. 6 is a cutaway perspective illustration of an isolator in the structural joint.

Referring to FIG. 6, the isolator 26 may be configured as an annular spacer and/or washer. The isolator 26 of FIG. 6, for example, includes an annular isolator body 58. The isolator 26 and its body 58 extend axially along the axis 36 between and to a first side 60 of the isolator 26 and a second side 62 of the isolator 26. The isolator 26 and its body 58 extend radially between and to a radial inner side 64 of the isolator 26 and a radial outer side 66 of the isolator 26. Referring to FIGS. 3 and 5, the isolator body 58 and its inner and outer sides 64 and 66 have a cross-sectional geometry when viewed in the reference plane. This cross-sectional geometry may have a circular shape. This cross-sectional geometry, however, may have various other non-circular shapes such as, but not limited to, an oval shape or a polygonal shape. Referring again to FIG. 6, the isolator 26 and its body 58 extend circumferentially about (e.g., completely around) the axis 36 providing the isolator 26 with, for example, a full-hoop body. The isolator body 58 is formed with one or more internal cavities 68; e.g., a network and/or a grid of internal cavities. These cavities 68 may be configured as discrete (e.g., completely separate) cavities, or one or more or all of the cavities 68 may be interconnected.

The cavities 68 may be arranged in one or more arrays 70A-D (generally referred to as "70"). Each of the cavity arrays 70A, 70C of FIG. 6 includes X number of the cavities 68. Each of the cavity arrays 70B, 70D of FIG. 6 includes Y number of the cavities 68, where the number Y may be different than the number X. The cavities 68 in each of the cavity arrays 70A, 70B, 70C, 70D are disposed at different locations along the axis 36. The cavities 68 in each of the cavity arrays 70A, 70B, 70C, 70D are thereby axially offset from one another along the axis 36; e.g., each cavity 68 in the array 70A is axially offset from each cavity 68 in the array, 70B, 70D. Corresponding cavities 68 in the cavity arrays 70A and 70C, 70B and 70D of FIG. 6 are disposed at a respective common radial location relative to the axis 36; e.g., disposed a common radial distance from the axis 36. The corresponding cavities 68 in the cavity arrays and 70C, 70B and 70D are thereby radially aligned relative to the axis 36; e.g., the cavities 68A and 68C, 68B and 68D are radially aligned, etc. However, the cavities 68 in the cavity arrays 70A and 70C are radially offset from the cavities 68 in the cavity arrays 70B and 70D; e.g., the cavities 68A and 68C are radially offset from the cavities 68B and 68D. With this arrangement, the cavities 68 are arranged within the isolator 26 obstruct a direct path (e.g., straight line path) along/parallel with the axis 36 through at least an intermediate region of the isolator body 58 from the isolator first side 60 to the isolator second side 62.

Figure 7:
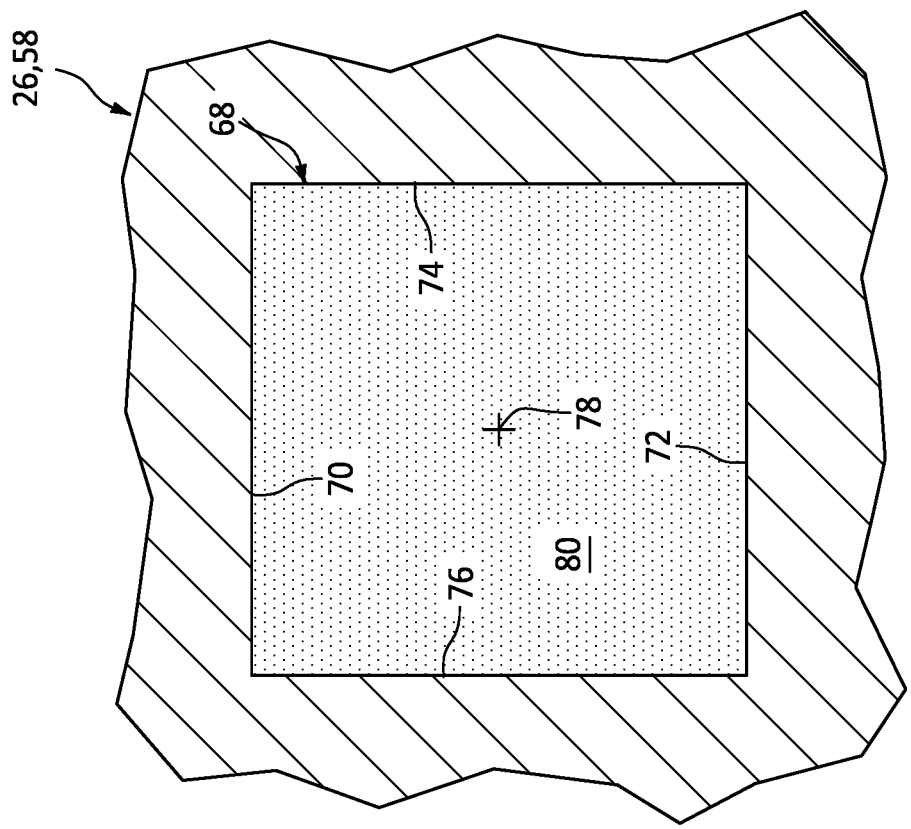
FIG. 7 is a sectional illustration of a portion of the isolator at an internal cavity filled with powder.

Referring to FIG. 7, each cavity 68 extends axially along the axis 36 within the isolator body 58 between and to an axial first side 70 of the respective cavity 68 and an axial second side 72 of the respective cavity 68. Each cavity 68 extends radially within the isolator body 58 between and to a radial inner side 74 of the respective cavity 68 and a radial outer side 76 of the respective cavity 68. Referring to FIGS. 3 and 5, each cavity 68 extends longitudinally along a longitudinal centerline 78 (partially shown in FIGS. 3 and 5 for ease of illustration) of the respective cavity 68 within the isolator body 58. Each longitudinal centerline 78 may be curved such that the respective longitudinal centerline 78 and, thus, the respective cavity 68 extend circumferentially about (e.g., completely around) the axis 36 providing the respective cavity 68 with an annular geometry.

Referring to FIG. 7, the isolator 26 also includes powder 80 within each of the cavities 68. This powder 80 may fill each of the cavities 68 such that each cavity 68 is a powder-filled cavity. The powder 80 and the isolator body 58 may be constructed from a common material; e.g., metal. For example, the isolator 26 may be formed using an additive manufacturing process such as a powder bed fusion process. During the additive manufacturing process, the isolator 26 may be built up layer-by-layer by selectively fusing feedstock powder using an energy beam; e.g., a laser beam or an electron beam. The feedstock powder that is fused together forms the isolator body 58. The feedstock material that is not fused (e.g., remains in powder form) and is within the cavities 68 of the isolator body 58 forms the powder 80. The present disclosure, however, is not limited to such an exemplary manufacturing process.

Referring to FIG. 1, the isolator 26 is arranged axially (e.g., vertically) between the first component 22 and the second component 24. The isolator 26 is seated in the first recess 34 and the second recess 50, where the first recess 34 and the second recess 50 collectively form a pocket 82 (e.g., an isolator receptacle) axially between the first component 22 and the second component 24. The isolator first side 60 axially contacts or otherwise engages the first component 22 at its first recess axial end 38. The isolator second side 62 axially contacts or otherwise engages the second component 24 at its second recess axial end 52. With this arrangement, the isolator 26 is sandwiched (e.g., clamped) between and forms a buffer between the first component 22 and the second component 24. A gap 84, for example, is formed by and extends axially between the first component second side 33 and the second component first side 44, which gap 84 physically separates the first component 22 from the second component 24. The first component 22 may thereby be disengaged directly from the second component 24; e.g., the first component 22 may not contact the second component 24.

The fastener 28 of FIG. 1 includes a head 86 and a shank 88 connected to (e.g., formed integral with or otherwise attached to) the head 86. The head 86 axially engages the first component 22 at its first component first side 32. More particularly, the head 86 of FIG. 1 axially contacts the fastener washer 30, which fastener washer axially contacts the first component first side 32. The shank 88 projects out from the head 86, and extends axially sequentially through a bore 90 through the fastener washer 30, the first fastener aperture 32, a bore 92 through the isolator 26 and is threaded into the second fastener aperture 48. The fastener 28 thereby secures (e.g., attaches, mechanically fastens) the first component 22 to the second component 24.

While the fastener 28 secures the first component 22 to the second component 24, the isolator 26 may at least partially isolate the first component 22 from the second component 24. The isolator 26 of FIG. 1, for example, is configured to attenuate (e.g., high frequency, such as a frequency greater than 100 Hz or 1000 Hz) shock wave or vibration transmission and/or heat transfer between the first component 22 and the second component 24. For example, inclusion of the cavities 68 may provide the isolator 26 with extended, tortuous load paths and/or heat transfer paths axially between the first component 22 and the second component 24. By increasing distances of these load paths and changing directions of these load paths, shock waves and/or the heat energy have a longer distance to dissipate across the isolator 26 between the first component 22 and the second component 24. Providing the isolator 26 with the cavities 68 may decrease an amount of material available for shock wave and/or heat energy transmission. Filling the cavities 68 with the unfused powder 80 of FIG. 7 (e.g., loose powder) may also further enhance attenuation of the shock waves and/or heat transfer. The shock waves, for example, may travel into the particles of the powder 80, which powder particles may vibrate within the cavities 68 facilitating conversion of the shock wave energy into heat energy. The powder particles may also provide increase a thermal capacitance of the isolator 26.

In some embodiments, referring to FIG. 1, the isolator pocket 82 projects axially into both the first component 22 and the second component 24. In other embodiments, however, the isolator pocket 82 may alternatively only project axially into the first component 22 or the second component 24. In still other embodiments, the isolator pocket 82 may be omitted and the isolator 26 may axially contact or otherwise engage the first component 22 at its second side 33 and the second component 24 at its first side 44.

In some embodiments, the isolator 26 may be formed as a discrete body from the first component 22 and the second component 24. In other embodiments, however, the isolator 26 may alternatively be formed integral with the first component 22 or the second component 24.

Figure 8:
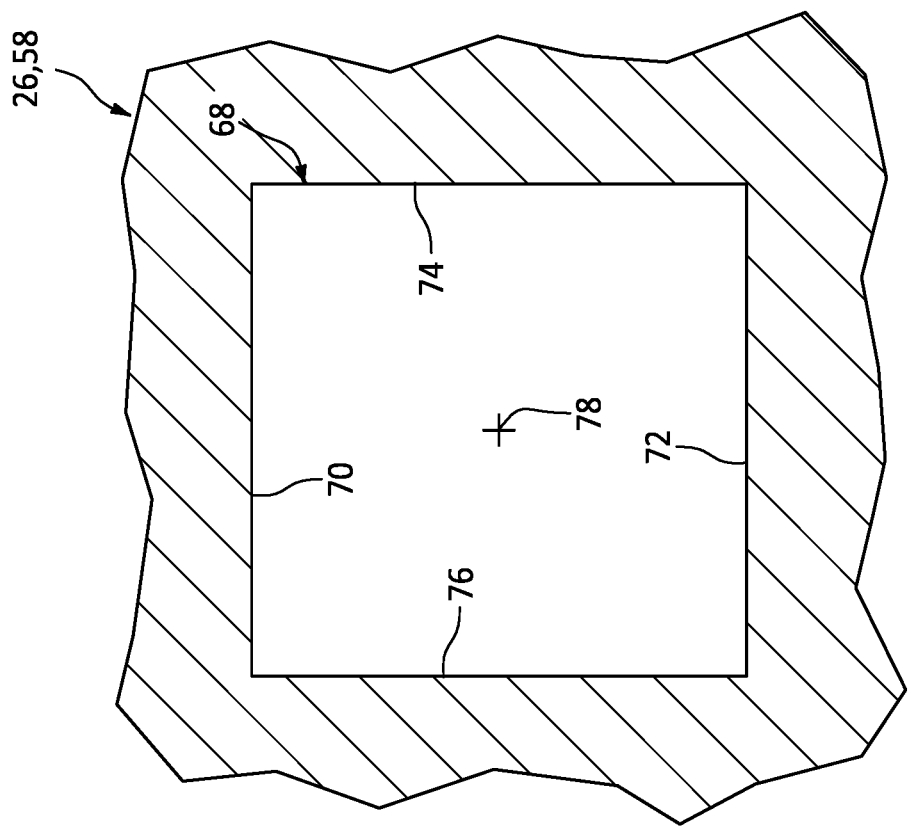
FIG. 8 is a sectional illustration of a portion of the isolator at an empty internal cavity.

In some embodiments, referring to FIG. 7, each of the cavities 68 may be filled with the powder 80. In other embodiments, referring to FIG. 8, one or more or all of the cavities 68 may each alternatively be empty; e.g., powder free.

Figure 9:
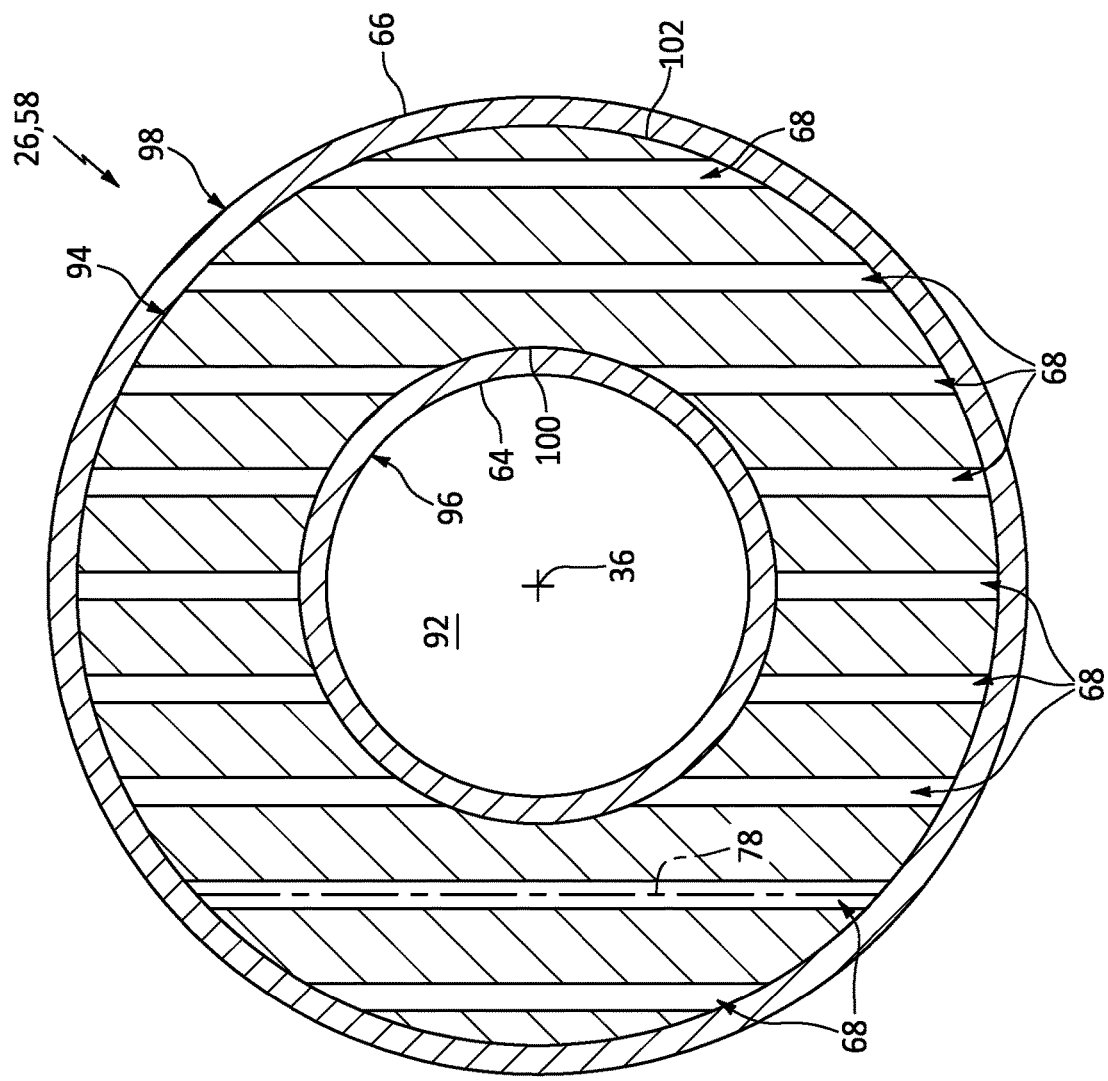
FIG. 9 is a cross-sectional illustration of the isolator with an alternative internal cavity configuration.

In some embodiments, referring to FIGS. 3 and 5, at least a portion or an entirety of each longitudinal centerline 78 may be curved; e.g., arcuate or circular. In other embodiments, referring to FIG. 9, the centerline 78 of one or more or all of the cavities 68 may be straight or otherwise non-curved. Each of the cavities 68 of FIG. 9, for example, extend laterally (e.g., radially, tangentially, acutely relative to the axis 36) within the isolator 26 and its isolator body 58.

In some embodiments, referring to FIG. 6, the isolator body 58 may be formed as a monolithic body; e.g., a single, unitary body. In other embodiments, referring to FIG. 9, the isolator body 58 may include a base 94 (e.g., an isolator core) and one or more walls 96 and 98. The cavities 68 may be formed by and within the base 94. Each cavity 68, for example, may be formed by drilling a hole through the base 94. Each cavity 68 may be filled (or not filled) with the powder 80; e.g., see FIG. 7. The inner wall 96 is then attached (e.g., welded, brazed, adhered and/or otherwise bonded) to the base 94 at an inner side 100 of the base 94, where the inner wall 96 covers (e.g., caps off) inner ends of the cavities 68. The outer wall 98 is attached (e.g., welded, brazed, adhered and/or otherwise bonded) to the base 94 at an outer side 102 of the base 94, where the outer wall 98 covers (e.g., caps off) outer ends of the cavities 68. Such an isolator configuration may also facilitate formation of the isolator 26 using more traditional manufacturing processes such as casting, machining, etc. The isolator 26 of FIG. 9, of course, may also or alternatively be manufactured using other processes such as additive manufacturing.

In some embodiments, the isolator body 58 and the powder 80 may be constructed from a common material such as, but not limited to, metal. In other embodiments, however, the isolator body 58 may be constructed from body material whereas the powder may be constructed from powder material that is different than the body material. The body material and the powder material, for example, may be different types of metal; e.g., a different pure metals, a different metal alloys, etc. In another example, the body material may be metal and the powder material may be a ceramic or any other metal or non-metal or composite material. The powder material, for example, may be selected with properties which further reduce heat transfer (e.g., have a low coefficient of thermal conduction), reduce vibration propagation, reduce shock propagation, etc. The present disclosure, of course, is not limited to the foregoing exemplary materials nor combinations of materials.

While the apparatus is described above with a single joint between the first component 22 and the second component 24, it should be understood that the apparatus may include multiple isolators 26 between the first component 22 and the second component 24 and multiple fasteners 28 securing the first component 22 to the second component 24.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A structural joint, comprising:
a first component;
a second component;
an isolator disposed axially along an axis between the first component and the second component, the isolator including a first side, a second side and a plurality of internal cavities, the isolator extending axially from the first side to the second side, the first side axially contacting the first component, the second side axially contacting the second component, and the plurality of internal cavities disposed between the first component and the second component, the plurality of internal cavities comprising a first cavity, and the isolator further including powder within the first cavity; and
a fastener projecting axially out of the first component, through the isolator and into the second component.

2. The structural joint of claim 1, wherein the isolator is configured to at least one of
attenuate shock wave transmission between the first component and the second component; or
attenuate heat transfer between the first component and the second component.

3. The structural joint of claim 1, wherein the isolator comprises metal.

4. The structural joint of claim 1, wherein
the isolator further includes an isolator body forming the plurality of internal cavities; and
the isolator body and the powder comprise a common material.

5. The structural joint of claim 1, wherein
the isolator further includes an isolator body forming the plurality of internal cavities;
the isolator body comprises body material; and
the powder comprises powder material that is different than the body material.

6. The structural joint of claim 1, wherein the first cavity extends circumferentially about the fastener.

7. The structural joint of claim 1, wherein
the first cavity has a longitudinal centerline;
the first cavity extends longitudinally along the longitudinal centerline within the isolator; and
at least a portion of the longitudinal centerline is curved.

8. The structural joint of claim 1, wherein
the first cavity has a longitudinal centerline;
the first cavity extends longitudinally along the longitudinal centerline within the isolator; and
at least a portion of the longitudinal centerline is straight.

9. The structural joint of claim 1, wherein
the isolator comprises a base, an inner wall and an outer wall;
the base extends circumferentially about the fastener and radially between an inner side and an outer side, and the plurality of internal cavities extend through the base;
the inner wall is attached to the base at the inner side and covers an inner side opening to at least one of the plurality of internal cavities; and
the outer wall is attached to the base at the outer side and covers an outer side opening to at least one of the plurality of internal cavities.

10. The structural joint of claim 1, wherein
the isolator extends circumferentially about the axis;
the plurality of internal cavities further comprises a second cavity; and
the first cavity is axially aligned with the second cavity along the axis.

11. The structural joint of claim 1, wherein
the isolator extends circumferentially about the axis;
the plurality of internal cavities further comprises a second cavity; and
the first cavity is axially offset from the second cavity along the axis.

12. The structural joint of claim 1, wherein
the isolator extends circumferentially about the axis;
the plurality of internal cavities further comprises a second cavity; and
the first cavity is radially aligned with the second cavity relative to the axis.

13. The structural joint of claim 1, wherein
the isolator extends circumferentially about the axis;
the plurality of internal cavities further comprises a second cavity; and
the first cavity is radially offset from the second cavity relative to the axis.

14. The structural joint of claim 1, wherein the isolator is disposed in a pocket formed by and between the first component and the second component.

15. The structural joint of claim 1, wherein the first component is not in contact with the second component.

16. The structural joint of claim 1, wherein
the fastener includes a head and a shank attached to the head;
the head is engaged with the first component, and the first component axially separates the head from the isolator; and
the shank projects axially out from the head, through the first component and the isolator, into the second component.

17. An isolator for a structural joint, comprising:
an annular body extending circumferentially around an axis, the annular body including a first cavity and a second cavity, the first cavity extending circumferentially about the axis within the annular body, the second cavity extending circumferentially about the axis within the annular body, and the second cavity axially offset from the first cavity along the axis and radially offset from the first cavity relative to the axis; and
powder within the first cavity and the second cavity;
the annular body comprising metal;
wherein at least one of the first cavity or the second cavity is configured as an annular cavity.

* * * * *